(12) United States Patent
Huo et al.

(10) Patent No.: US 9,754,157 B2
(45) Date of Patent: Sep. 5, 2017

(54) METHOD AND APPARATUS FOR SUMMARIZATION BASED ON FACIAL EXPRESSIONS

(71) Applicant: Nokia Technologies Oy, Espoo (FI)

(72) Inventors: Da Huo, Beijing (CN); Canfeng Chen, Beijing (CN)

(73) Assignee: Nokia Technologies Oy, Espoo (FI)

( * ) Notice: Subject to any disclaimer, the term of this patent is extended or adjusted under 35 U.S.C. 154(b) by 34 days.

(21) Appl. No.: 14/436,941

(22) PCT Filed: Nov. 6, 2012

(86) PCT No.: PCT/CN2012/084151
§ 371 (c)(1),
(2) Date: Apr. 20, 2015

(87) PCT Pub. No.: WO2014/071558
PCT Pub. Date: May 15, 2014

(65) Prior Publication Data
US 2015/0262000 A1    Sep. 17, 2015

(51) Int. Cl.
*G06K 9/00* (2006.01)
*G06F 17/30* (2006.01)
*G06K 9/46* (2006.01)

(52) U.S. Cl.
CPC ... *G06K 9/00302* (2013.01); *G06F 17/30268* (2013.01); *G06K 9/00315* (2013.01);
(Continued)

(58) Field of Classification Search
CPC .......... G06K 9/00302; G06K 9/00315; G06K 9/00718; G06K 9/00765; G06K 9/4642; G06F 17/30268
(Continued)

(56) References Cited

U.S. PATENT DOCUMENTS 7,483,618 B1    1/2009  Edwards et al.
7,796,785 B2 *  9/2010  Takemoto ................ H04N 5/91
                                           382/118
(Continued)

FOREIGN PATENT DOCUMENTS

CN    101394522 A    3/2009
CN    101547333 A    9/2009
CN    101930611 A    12/2010

OTHER PUBLICATIONS

International Search Report and Written Opinion received for corresponding Patent Cooperation Treaty Application No. PCT/CN2012/084151, dated Nov. 6, 2012, 11 pages.
(Continued)

*Primary Examiner* — Daniel Mariam
(74) *Attorney, Agent, or Firm* — Alston & Bird LLP

(57) ABSTRACT

A method, apparatus, computer program product and system are provided for facilitating video and/or image summarization based on facial expressions. In this regard, a method is provided that includes receiving one or more first frames and one or more second frames, determining information regarding one or more facial expressions contained in the one or more second frames, and causing the information regarding the one or more facial expressions to be associated with at least one of the one or more first frames.

20 Claims, 6 Drawing Sheets

(52) U.S. Cl.
CPC ..... *G06K 9/00718* (2013.01); *G06K 9/00765* (2013.01); *G06K 9/4642* (2013.01)

(58) Field of Classification Search
USPC .......................................... 382/118, 199, 313
See application file for complete search history.

(56) References Cited

U.S. PATENT DOCUMENTS

| | | | |
|---|---|---|---|
| 9,241,131 B2* | 1/2016 | Desai | H04N 7/141 |
| 2004/0052505 A1 | 3/2004 | Ahmad et al. | |
| 2008/0260255 A1 | 10/2008 | Fukushima et al. | |
| 2009/0185626 A1 | 7/2009 | Seupel et al. | |
| 2011/0058713 A1* | 3/2011 | Kogane | G06K 9/00308 |
| | | | 382/118 |
| 2011/0263946 A1 | 10/2011 | El Kaliouby et al. | |
| 2012/0106925 A1 | 5/2012 | Dirik et al. | |
| 2013/0243241 A1* | 9/2013 | Shaick | G06K 9/00261 |
| | | | 382/103 |
| 2015/0193718 A1* | 7/2015 | Shaburov | G06Q 10/06395 |
| | | | 705/7.39 |

OTHER PUBLICATIONS

Michel et al., "Real Time Facial Expression Recognition in Video Using Support Vector Machines", Proceedings of the 5th international conference on Multimodal interfaces, Nov. 5-7, 2003, pp. 258-264.
Truong et al., "Video Abstraction: A Systematic Review and Classification", Journal ACM Transactions on Multimedia Computing, Communications, and Applications, vol. 3, No. 1, Feb. 2007, pp. 1-37.
Dony et al., "Techniques for Automated Reverse Storyboarding", IEE Proceedings—Vision, Image and Signal Processing, vol. 152, No. 4, Aug. 2005, pp. 425-436.
Yeung et al., "Efficient Matching and Clustering of Video Shots", Proceedings of the 1995 International Conference on Image Processing, vol. 1, Oct. 1995, pp. 338-341.
Gatica-Perez et al., "Linking Objects in Videos by Importance Sampling", IEEE Proceedings of International Conference on Multimedia and Expo, Aug. 2002, pp. 525-528.
Taskiran et al., "Automated Video Program Summarization Using Speech Transcripts", Journal IEEE Transactions pn Multimedia, vol. 8, No. 4, Aug. 2006, pp. 775-791.
Pang et al., "Fast Haar Transform Based Feature Extraction for Face Representation and Recognition", IEEE Transactions on Information Forensics and Security, vol. 4, No. 3, Sep. 2009, pp. 441-450.
Cooray et al., "An Interactive and Multi-level Framework for Summarising User Generated Videos", Proceedings of the 17th ACM international conference on Multimedia, Oct. 19-24, 2009, pp. 685-688.
Ju et al., "Summarization of Video-taped Presentations: Automatic Analysis of Motion and Gesture", IEEE Transactions on Circuits and Systems for Video Technology, vol. 8, No. 5, Sep. 1998, pp. 686-696.
Yow et al., "Analysis and Presentation of Soccer Highlights From Digital Video", Proceedings, Second Asian Conference on Computer Vision,1995, 5 pages.
Zhai et al., "Automatic Segmentation of Home Videos", Proceedings of IEEE conference on Multimedia and Expo, Jul. 6, 2005, pp. 1-4.
Girgensohn et al., "A Semi-automatic Approach to Home Video Editing", Proceedings of the 13th annual ACM symposium on User interface software and technology, Nov. 1, 2000, pp. 81-89.
Mei et al., "Modeling and Mining of Users' Capture Intention for Home Videos", IEEE Transactions on Multimedia, vol. 9, No. 1, Jan. 2007, pp. 66-77.
Takeuchi et al., "User-adaptive Home Video Summarization Using Personal Photo Libraries", Proceedings of the 6th ACM international conference on Image and video retrieval, Jul. 2007, pp. 472-479.
Valdes et al., "Introducing RISPlayer: Real-time Interactive Generation of Personalized Video Summaries", Proceedings of the 2010 ACM workshop on Social, adaptive and personalized multimedia interaction and access, Oct. 29, 2010, pp. 9-14.
Joho et al., "Exploiting Facial Expressions for Affective Video Summarisation", Proceedings of the ACM International Conference on Image and Video Retrieval, Jul. 8-10, 2009, 8 pages.
Viallet et al., "Face Detection for Video Summaries", Image and video retrieval Lecture Notes in Computer Science, vol. 2383, Jul. 4, 2002, 8 pages.
Peng et al., "Editing by Viewing: Automatic Home Video Summarization by Viewing Behavior Analysis", IEEE Transactions on Multimedia, vol. 13, No. 3, Jun. 2011, pp. 539-550.
Zhu et al., "A New Diamond Search Algorithm for Fast Block-matching Motion Estimation", IEEE Transactions on Image Processing, vol. 9, No. 2, Feb. 2000, pp. 287-290.
Deng et al., "A New Facial Expression Recognition Method Based on Local Gabor Filter Bank and PCA Plus LDA", International Journal of Information Technology, vol. 11, No. 11, 2005, pp. 86-96.
Extended European Search Report received for corresponding European Patent Application No. 12887998.8, dated Jul. 26, 2016, 9 pages.
Zeng et al., "Instant Video Summarization During Shooting With Mobile Phone", Proceedings of the 1st ACM International Conference on Multimedia Retrieval, 2011, 8 pages.
Joho et al., "Looking at the Viewer: Analysing Facial Activity to Detect Personal Highlights of Multimedia Contents", Multimedia Tools and Applications, vol. 51, No. 2, Oct. 28, 2010, pp. 505-523.
Ma et al., "A User Attention Model for Video Summarization", Proceedings of the tenth ACM international conference on Multimedia, Dec. 1-6, 2002, pp. 533-542.
Office Action form Chinese Patent Application No. 201280076882.9 dated Apr. 19, 2017, 16 pages.

* cited by examiner

METHOD AND APPARATUS FOR SUMMARIZATION BASED ON FACIAL EXPRESSIONS

RELATED APPLICATION

This application was originally filed as Patent Cooperation Treaty Application No. PCT/CN2012/084151 filed Nov. 6, 2012.

TECHNOLOGICAL FIELD

An example embodiment of the present invention relates generally to techniques for the summarization of image and video summarization and, more particularly, to a method and apparatus for facilitating image and/or video summarization based on facial expressions.

BACKGROUND

The integration of high quality cameras into mobile devices and the rapid growth of media sharing platforms such as YouTube, Instagram and the like have caused more and more people to become interested in capturing and sharing videos and photographs of special occasions and everyday life. The large amount of photographic and video content being recorded by mobile device users has led to increased demand for quick and easy video editing and photo filtering and/or sorting methods.

With respect to videos, many videos shot by mobile device users may contain substantial amounts of irrelevant or uninteresting content, which may turn off viewers. However, existing video editing tools typically require a laborious process that is not particularly user-friendly. Thus, automatic video summarization, which reduces videos to segments of modest length while retaining interesting content, would be a more ideal solution.

Similarly, mobile device users may tend to take photographs in large quantities and, faced with no easy method of filtering out less interesting photos, simply upload everything to a media sharing platform. Thus, automatic image summarization, which may organize, tag, and/or filter photographs, would also be of benefit.

BRIEF SUMMARY

A method, apparatus and computer program product are therefore provided according to an example embodiment of the present invention for facilitating image and/or video summarization based on facial expressions. In this regard, the method, apparatus, and computer program product of one embodiment may receive one or more first frames and one or more second frames, determine information regarding one or more facial expressions contained in the one or more second frames, and cause the information regarding the one or more facial expressions to be associated with at least one of the one or more first frames. In this way, the method, apparatus, and computer program products of example embodiments may facilitate image and/or video summarization, for example, based on the facial expressions of the user taking the photos or recording the video, such as with a dual camera mobile device.

In one embodiment, a method is provided that includes receiving one or more first frames and one or more second frames, determining information regarding one or more facial expressions contained in the one or more second frames, and causing the information regarding the one or more facial expressions to be associated with at least one of the one or more first frames.

In a further embodiment, a method is provided that includes receiving a first still image and a second still image, determining information regarding one or more facial expressions contained in the second still image, and causing the first still image to be tagged with an indication of the information regarding the one or more facial expressions contained in the second image.

In another embodiment, a method is provided that includes receiving a first plurality of video frames and a second plurality of video frames and determining, in the first plurality of video frames, at least one video segment. The method further includes detecting, in the second plurality of video frames, at least one facial expression change and determining, based at least in part on the at least one facial expression change, at least on key frame of the at least one video segment. The method even further includes causing the at least one key frame to be associated with the at least one video segment.

In a yet another embodiment, an apparatus is provided that includes at least one processor and at least one memory including program code instructions, the at least one memory and the program code instructions being configured to, with the processor, direct the apparatus to at least receive one or more first frames and one or more second frames, determine information regarding one or more facial expressions contained in the one or more second frames, and cause the information regarding the one or more facial expressions to be associated with at least one of the one or more first frames.

In a further embodiment, an apparatus is provided that includes at least one processor and at least one memory including program code instructions, the at least one memory and the program code instructions being configured to, with the processor, direct the apparatus to at least receive a first still image and a second still image, determine information regarding one or more facial expressions contained in the second still image, and cause the first still image to be tagged with an indication of the information regarding the one or more facial expressions contained in the second image.

In another embodiment, an apparatus is provided that includes at least one processor and at least one memory including program code instructions, the at least one memory and the program code instructions being configured to, with the processor, direct the apparatus to at least receive a first plurality of video frames and a second plurality of video frames and determine, in the first plurality of video frames, at least one video segment. The apparatus is further directed to detect, in the second plurality of video frames, at least one facial expression change and determining, based at least in part on the at least one facial expression change, at least on key frame of the at least one video segment. The apparatus is even further directed to cause the at least one key frame to be associated with the at least one video segment.

In yet another embodiment, a computer program product is provided that includes a non-transitory computer readable medium storing program code portions therein. The computer program code instructions are configured to, upon execution, direct an apparatus to at least receive one or more first frames and one or more second frames, determine information regarding one or more facial expressions contained in the one or more second frames, and cause the information regarding the one or more facial expressions to be associated with at least one of the one or more first frames.

In a further embodiment, a computer program product is provided that includes a non-transitory computer readable medium storing program code portions therein. The computer program code instructions are configured to, upon execution, direct an apparatus to at least receive a first still image and a second still image, determine information regarding one or more facial expressions contained in the second still image, and cause the first still image to be tagged with an indication of the information regarding the one or more facial expressions contained in the second image.

In another embodiment, a computer program product is provided that includes a non-transitory computer readable medium storing program code portions therein. The computer program code instructions are configured to, upon execution, direct an apparatus to at least receive a first plurality of video frames and a second plurality of video frames and determine, in the first plurality of video frames, at least one video segment. The apparatus is further directed to detect, in the second plurality of video frames, at least one facial expression change and determining, based at least in part on the at least one facial expression change, at least on key frame of the at least one video segment. The apparatus is even further directed to cause the at least one key frame to be associated with the at least one video segment.

In yet another embodiment, an apparatus is provided that includes means for receiving one or more first frames and one or more second frames, means for determining information regarding one or more facial expressions contained in the one or more second frames, and means for causing the information regarding the one or more facial expressions to be associated with at least one of the one or more first frames.

In a further embodiment, an apparatus is provided that includes means for receiving a first still image and a second still image, means for determining information regarding one or more facial expressions contained in the second still image, and means for causing the first still image to be tagged with an indication of the information regarding the one or more facial expressions contained in the second image.

In another embodiment, an apparatus is provided that includes means for receiving a first plurality of video frames and a second plurality of video frames and means for determining, in the first plurality of video frames, at least one video segment. The apparatus further includes means for detecting, in the second plurality of video frames, at least one facial expression change and means for determining, based at least in part on the at least one facial expression change, at least on key frame of the at least one video segment. The apparatus even further includes means for causing the at least one key frame to be associated with the at least one video segment.

BRIEF DESCRIPTION OF THE DRAWINGS

Figure 2:
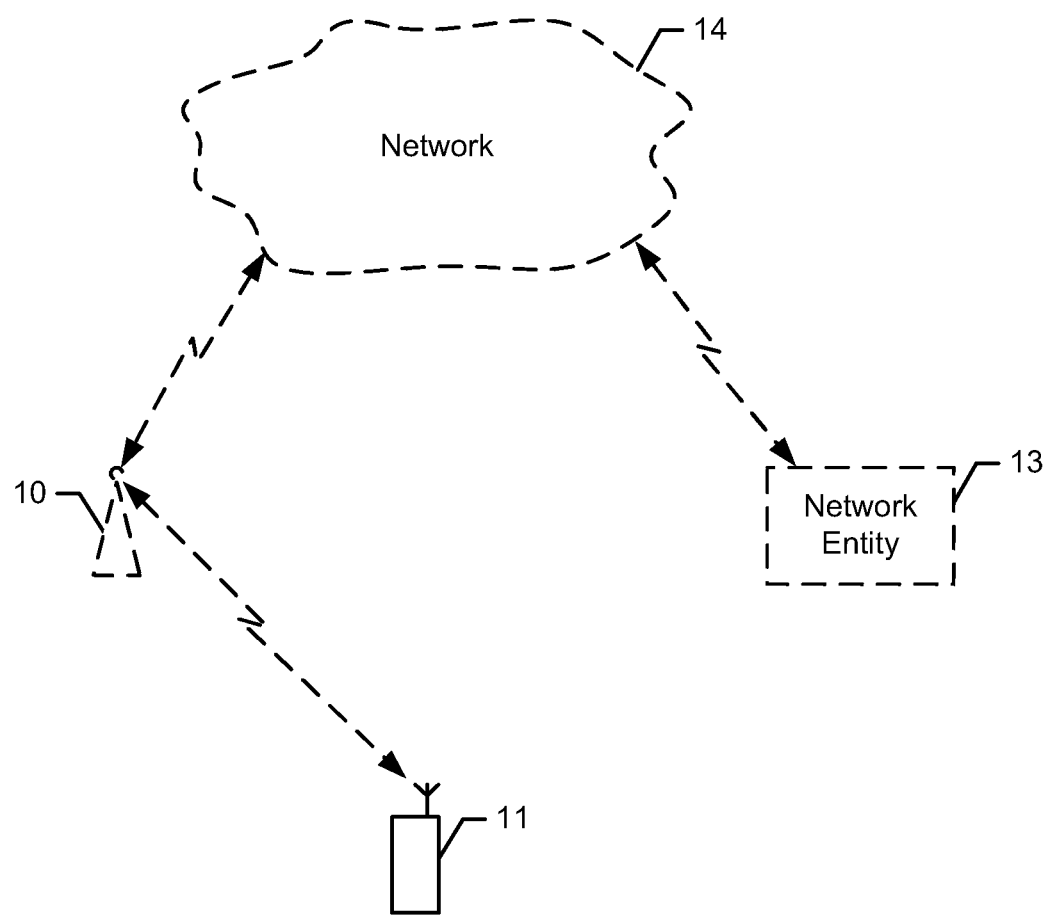
Figure 3:
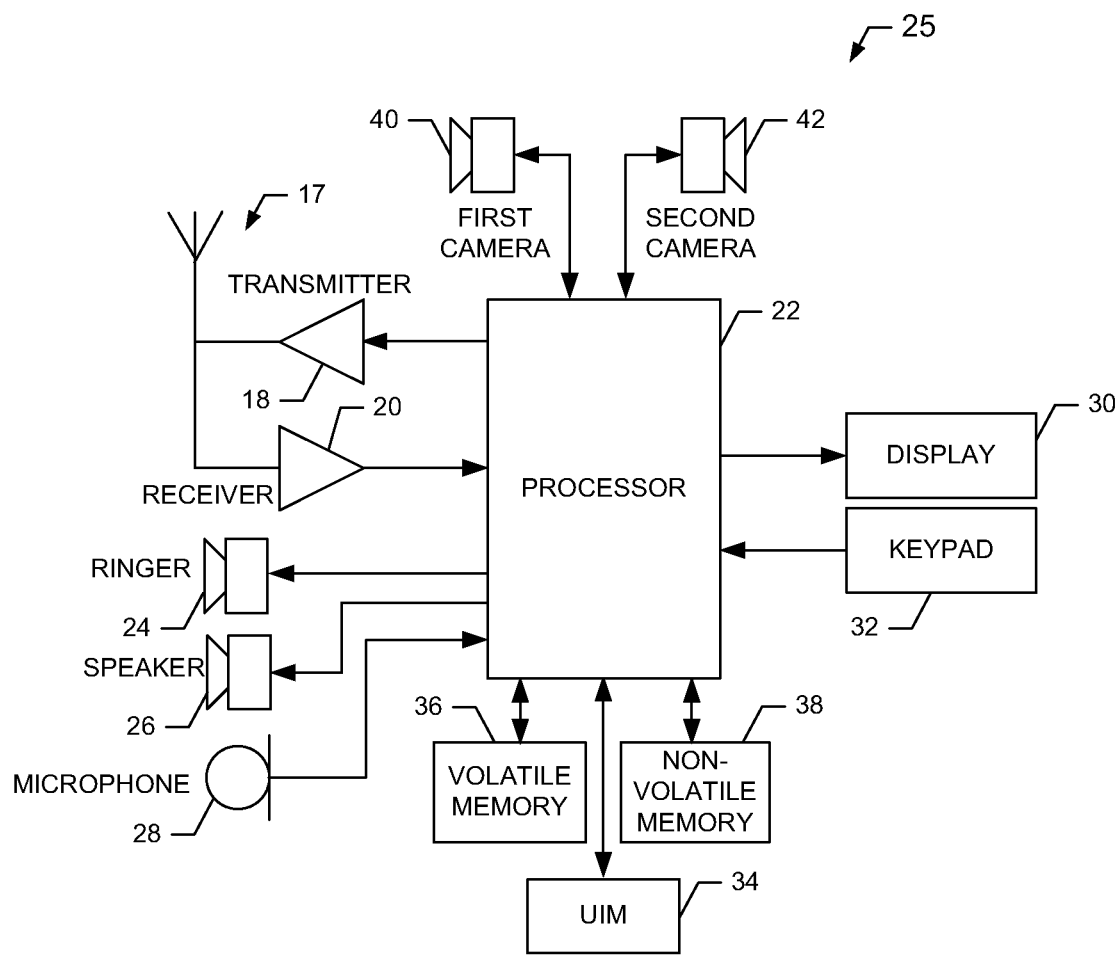
Figure 4:
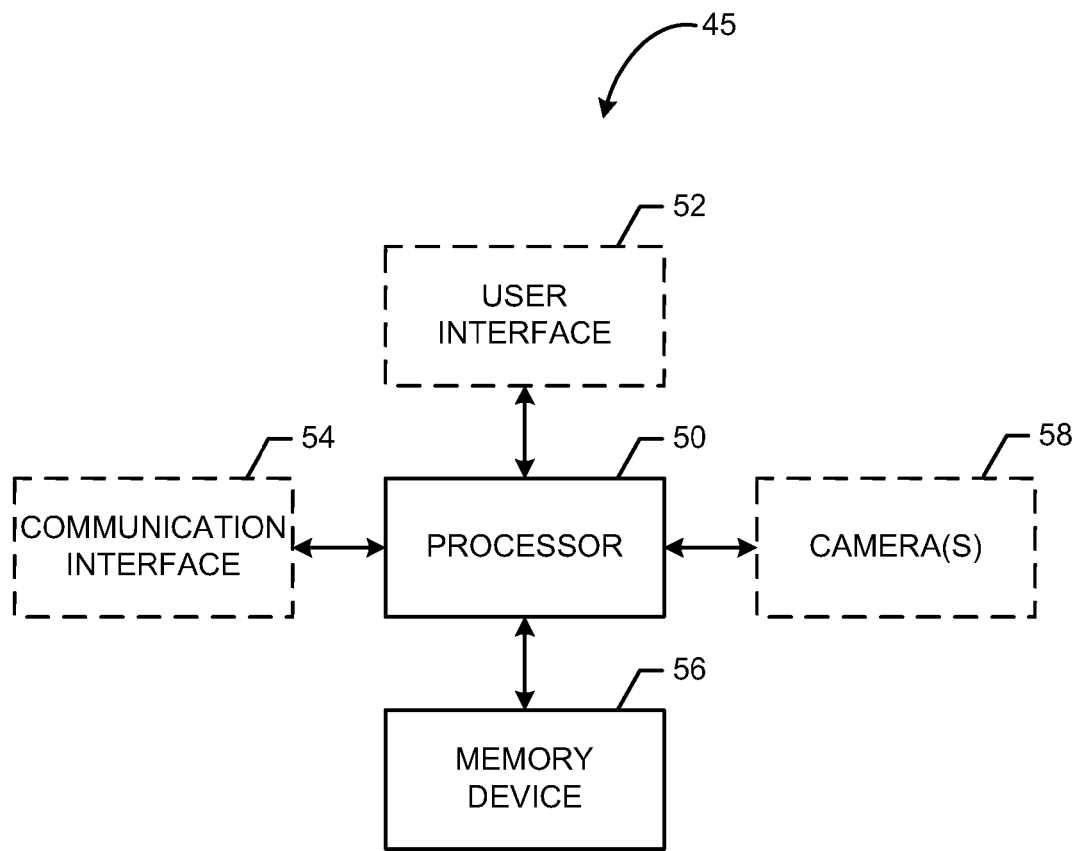
Figure 5:
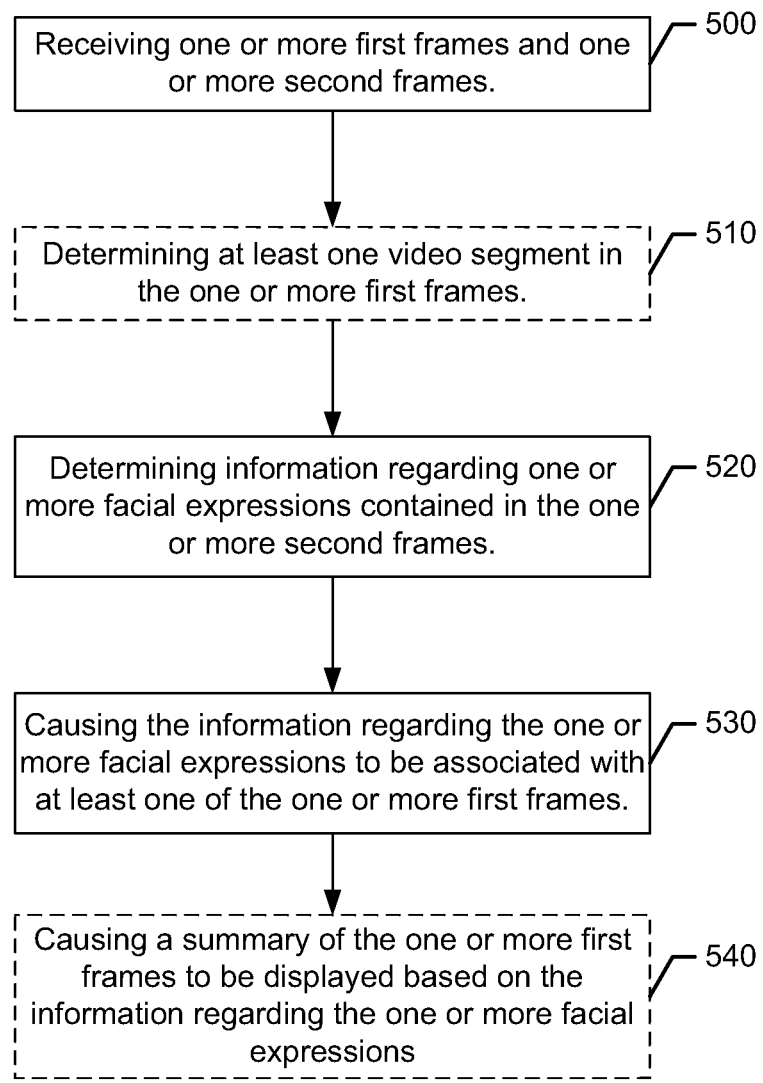
Figure 6:
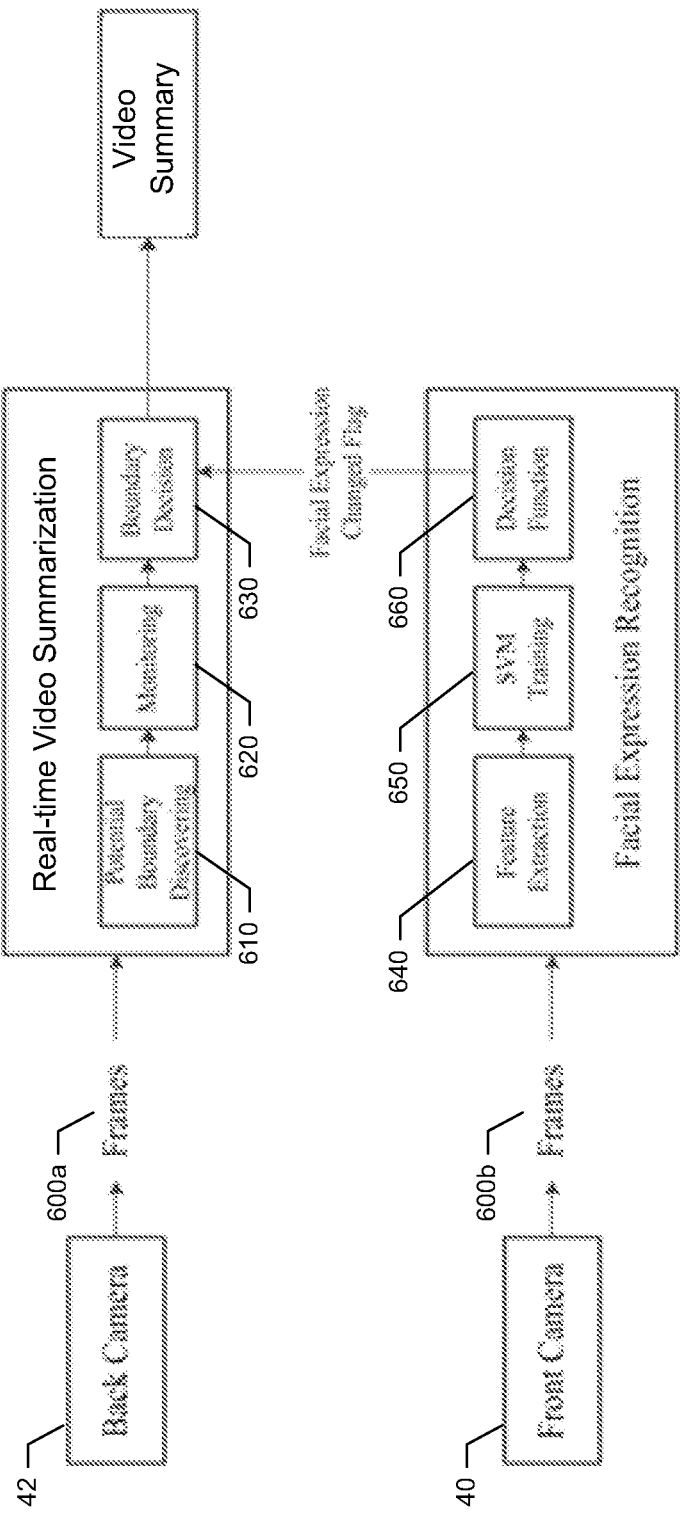

Having thus described example embodiments of the invention in general terms, reference will now be made to the accompanying drawings, which are not necessarily drawn to scale, and wherein:

FIG. 1 is a schematic representation of the various steps presently required for video summarization;

FIG. 2 is a schematic overview of a summarization process according to an example embodiment of the present invention;

FIG. 3 is a block diagram of an electronic device that may be configured to implement example embodiments of the present invention FIG. 4 is a block diagram of an apparatus that may be embodied by or associated with an electronic device, and may be configured to implement example embodiments of the present invention;

FIG. 5 is a flowchart representing operations performed in accordance with example embodiments of the present invention; and FIG. 6 is a flowchart representing operations performed in accordance with example embodiments of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received, processed and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

Figure 1A:
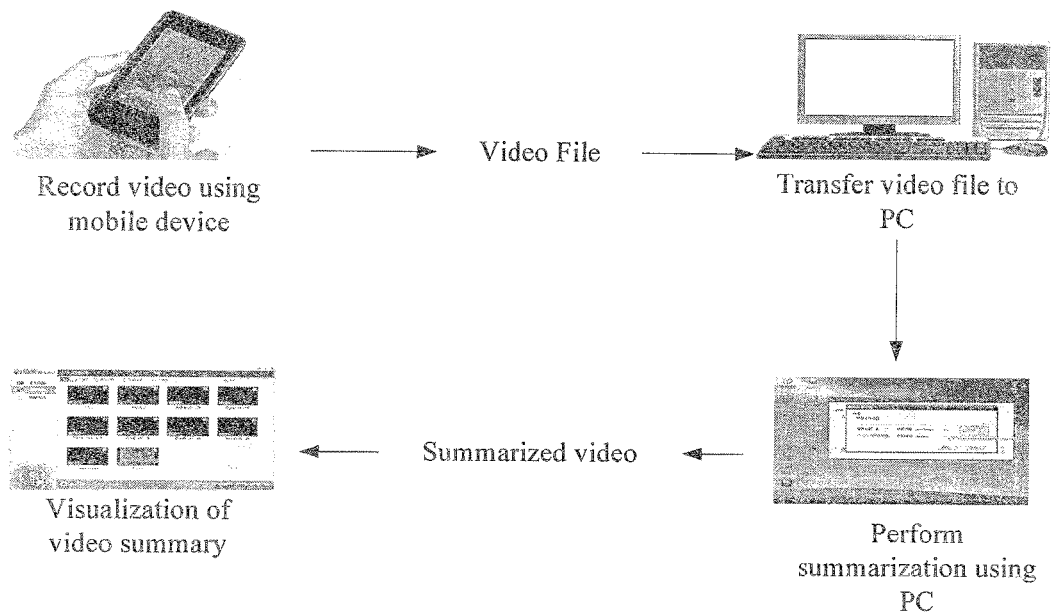

FIG. 1a illustrates a block diagram of the steps and devices currently involved in video summarization. As shown in FIG. 1, video summarization (e.g., the process of breaking a single video into a collection of video segments) can be a tedious and time-consuming task involving multiple file transfers. Automatic summarization may be particularly challenging when performed on amateur video, e.g., home videos or videos recorded via mobile electronic devices, due to their unconstrained content and lack of pre-imposed structure. The lack of success in automatic video summarization as applied to home videos may be partly due to reliance on a single set of summarization rules that apply to all users, not taking into account differences in user preferences. Furthermore, due to their high resource requirements, users will often need to transmit video files from a mobile device to a PC to use conventional summarization techniques, as shown in FIG. 1. This extra post-processing may be burdensome to users and may dissuade them from summarizing home videos captured on their mobile devices.

A central task in video summarization is identifying "important" or "exciting" video segments. Finding a generic definition for visual importance is difficult due to the lack of tools for modeling human cognition and affection. However, the human face possesses superior expressive ability and provides one of the most powerful, versatile and natural means of communicating motivational and affective state (such as anger, sadness, happiness, etc.). Facial expression constitutes 55 percent of the effect of a communicated message and is hence a major modality in human communication.

With the development of modern mobile devices, many mobile devices possess multiple cameras, such as a front camera and a back camera. It is therefore possible to capture one or more frames of a user's face by using a front camera while the user shoots video or takes pictures using the back camera. Thus, example embodiments of the present invention may leverage this ability of many mobile devices in order to facilitate real-time generation of video summaries by recognizing user facial expression during the shooting process on mobile devices. Real-time summarization may allow video summaries to be generated and visualized simultaneously. According to some example embodiments, video summaries may even be generated and visualized simultaneously with the recording process.

Figure 1B:
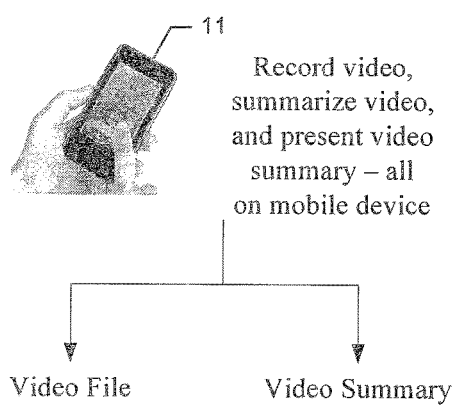

Thus, as depicted in FIG. 1b and as described below, a method, apparatus and computer program product are provided for facilitating image and/or video summarization based on facial expressions. In this regard, the method, apparatus, and computer program product of one embodiment may, for example, allow image and/or video summarization to be performed in real time based on facial expressions, such as the facial expressions of an operator of a dual camera device. Embodiments of the present invention may allow the summarization and visualization processes to occur in what appears to be a single step to the user. That is, the user may be required to do no more than record the video with a user device 11, while summarization and visualization takes place transparently in the background, with little or no user intervention. Embodiments of the present invention may also, for example, be applied to still photographs. Thus, photographs may, for example, be automatically tagged, sorted, filtered or the like as they are taken, using similar techniques to those used by the automatic video summarization process.

FIG. 2 illustrates a block diagram of a system that may benefit from embodiments of the present invention. While FIG. 2 illustrates one example of a system that would benefit from the present invention, numerous other systems and configurations may also benefit from embodiments of the present invention. With reference to FIG. 2, however, the system may include a user device 11, connected to a network 14 via an access point 10, and a network entity 13 also connected to network 14. User device 11 may be any device that is configured to communicate over any type of network. For example, user device 11 may be a mobile terminal, such as a mobile telephone, PDA, pager, laptop computer, tablet computer, or any of numerous other hand held or portable communication devices, computation devices, content generation devices, content consumption devices, or combinations thereof. User device 11 and network entity 13 may include or be associated with an apparatus 45, such as shown in FIG. 4, configured in accordance with embodiments of the present invention, as described below.

As shown in FIG. 2, user device 11 and network entity 13 may communicate with one another via network 14, which user device 11 may connect to via access point 10. User device 11 and access point 10 may communicate with each other via wireless means such as, for example, WI-FI, BLUETOOTH, or the like, or via wired means such as Ethernet, USB (Universal Serial Bus), or the like. Access point 10 may also allow device 11 to access network 14 via a wireless network, such as a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network or other type of network. Access point 10 may communicate with network 14 via wired means, such as via fiber optic or coaxial cable, twisted-pair Ethernet cable, digital subscriber line (DSL), or by connecting with a wireless network, such as a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network or other type of network. Network entity 13 may similarly communicate with network 14 via wired or wireless means. As described below, and as indicated by the dashed lines in FIG. 2, the presence of the access point 10, network 14, and network entity 13 are optional. In other words, example embodiments of the present invention may be implemented solely in user device 11, e.g., solely implemented via an apparatus embodied by or otherwise associated with user device 11. However, other example embodiments of the present invention may distribute functionality over multiple devices, e.g., operations may be performed by one or more apparatuses embodied by or otherwise associated with user device 11 and network entity 13. Thus, for example, according to one example embodiment videos and/or images captured via user device 11 may be summarized via an apparatus embodied by or otherwise associated with the user device 11. However, according to another example embodiment, videos and/or images captured via user device 11 may be transmitted to network entity 13 and summarized via an apparatus embodied by or otherwise associated with the network entity 13.

In one embodiment, user device 11 may be embodied by a mobile terminal. In this regard, a block diagram of a mobile terminal 25 that would benefit from embodiments of the present invention is illustrated in FIG. 3. It should be understood, however, that the mobile terminal 25 as illustrated and hereinafter described is merely illustrative of one type of user device that may benefit from embodiments of the present invention and, therefore, should not be taken to limit the scope of embodiments of the present invention. As such, although numerous types of mobile terminals, such as PDAs, mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, may readily employ embodiments of the present invention, other user devices including fixed (non-mobile) electronic devices may also employ some example embodiments.

The mobile terminal 25 may include an antenna 17 (or multiple antennas) in operable communication with a transmitter 18 and a receiver 20. The mobile terminal 25 may further include an apparatus, such as a processor 22 or other processing device (e.g., processor 50 of the apparatus of FIG. 3), which controls the provision of signals to, and the receipt of signals from, the transmitter 18 and receiver 20, respectively. The signals may include signaling information in accordance with the air interface standard of an applicable cellular system, and also user speech, received data and/or user generated data. In this regard, the mobile terminal 25 is capable of operating with one or more air interface standards, communication protocols, modulation types, and access types. By way of illustration, the mobile terminal 25 is capable of operating in accordance with wireless communication mechanisms. For example, mobile terminal 25 may be capable of communicating in a wireless local area network (WLAN) or other communication networks, for example in accordance with one or more of the IEEE 802.11 family of standards, such as 802.11a, b, g, or n. As an alternative (or additionally), the mobile terminal 25 may be capable of operating in accordance with any of a number of first, second, third and/or fourth-generation cellular communication protocols or the like. For example, the mobile terminal 25 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like.

In some embodiments, the processor 22 may include circuitry desirable for implementing audio and logic functions of the mobile terminal 25. For example, the processor 22 may be comprised of a digital signal processor device, a microprocessor device, and various analog to digital converters, digital to analog converters, and other support circuits. Control and signal processing functions of the mobile terminal 25 are allocated between these devices according to their respective capabilities. The processor 22 thus may also include the functionality to convolutionally encode and interleave message and data prior to modulation and transmission. The processor 22 may additionally include an internal voice coder, and may include an internal data modem. Further, the processor 22 may include functionality to operate one or more software programs, which may be stored in memory. For example, the processor 22 may be capable of operating a connectivity program, such as a conventional Web browser. The connectivity program may then allow the mobile terminal 25 to transmit and receive Web content, such as location-based content and/or other web page content, according to a Wireless Application Protocol (WAP), Hypertext Transfer Protocol (HTTP) and/or the like, for example.

The mobile terminal 25 may also comprise a user interface including an output device such as a conventional earphone or speaker 26, a ringer 24, a microphone 28, a display 30, first and second cameras 40, 42 and a user input interface, all of which are coupled to the processor 22. The first and second cameras 40, 42 may be configured to capture still images and/or video and to provide the still images and/or video to the processor for processing. The user input interface, which allows the mobile terminal 25 to receive data, may include any of a number of devices allowing the mobile terminal 25 to receive data, such as a keypad 32, a touch screen display (display 30 providing an example of such a touch screen display) or other input device. In embodiments including the keypad 32, the keypad 32 may include the conventional numeric (0-9) and related keys (#, *), and other hard and soft keys used for operating the mobile terminal 25. Alternatively or additionally, the keypad 32 may include a conventional QWERTY keypad arrangement. The keypad 32 may also include various soft keys with associated functions. In addition, or alternatively, the mobile terminal 25 may include an interface device such as a joystick or other user input interface. Some embodiments employing a touch screen display, as described further below, may omit the keypad 32 and any or all of the speaker 26, ringer 24, and microphone 28 entirely. The mobile terminal 25 further includes a battery, such as a vibrating battery pack, for powering various circuits that are required to operate the mobile terminal 25, as well as optionally providing mechanical vibration as a detectable output.

The mobile terminal 25 may further include a user identity module (UIM) 34. The UIM 34 is typically a memory device having a processor built in. The UIM 34 may include, for example, a subscriber identity module (SIM), a universal integrated circuit card (UICC), a universal subscriber identity module (USIM), a removable user identity module (R-UIM), etc. The UIM 34 typically stores information elements related to a mobile subscriber. In addition to the UIM 34, the mobile terminal 25 may be equipped with memory. For example, the mobile terminal 25 may include volatile memory 36, such as volatile Random Access Memory (RAM) including a cache area for the temporary storage of data. The mobile terminal 15 may also include other non-volatile memory 38, which may be embedded and/or may be removable. The memories may store any of a number of pieces of information, and data, used by the mobile terminal 15 to implement the functions of the mobile terminal 25.

Example embodiments of the invention will now be described with reference to FIG. 4, in which certain elements of an apparatus 45 for facilitating image and/or video summarization based on facial expressions. The apparatus 45 of FIG. 3 may be employed, for example, in conjunction with user device 11. However, it should be noted that the apparatus 45 of FIG. 3 may also be employed in connection with a variety of other devices, both mobile and fixed, in order to facilitate image and/or video summarization based on facial expressions. For example, the apparatus 45 may be embodied by or associated with a personal computer or other user terminal.

It should also be noted that while FIG. 3 illustrates one example of a configuration of an apparatus 45 for facilitating image and/or video summarization based on facial expressions, numerous other configurations may also be used to implement embodiments of the present invention. As such, in some embodiments, although devices or elements are shown as being in communication with each other, hereinafter such devices or elements should be considered to be capable of being embodied within a same device or element and thus, devices or elements shown in communication should be understood to alternatively be portions of the same device or element.

Referring now to FIG. 4, the apparatus 45 for facilitating image and/or video summarization based on facial expressions may include or otherwise be in communication with a processor 50 and a memory device 56. As described below and as indicated by the dashed lines in FIG. 4, the apparatus 45 may also optionally include a user interface 52, a communication interface 54, and/or one or more cameras 58 in some embodiments. In some embodiments, the processor 50 (and/or co-processors or any other processing circuitry assisting or otherwise associated with the processor 50) may be in communication with the memory device 56 via a bus for passing information among components of the apparatus 45. The memory device 56 may include, for example, one or more volatile and/or non-volatile memories. In other words, for example, the memory device 56 may be an electronic storage device (e.g., a computer readable storage medium) comprising gates configured to store data (e.g., bits) that may be retrievable by a machine (e.g., a computing device like the processor 50). In the embodiment in which the apparatus 45 is embodied as a mobile terminal 25, the memory device 56 may be embodied by the memory 36, 38 and the one or more cameras 58 may be embodied by first and second cameras 40, 42. The memory device 56 may be configured to store information, data, content, applications, instructions, or the like, for enabling the apparatus to carry out various functions in accordance with an example embodiment of the present invention. For example, the memory device 56 could be configured to buffer input data, such as image and/or video data from the one or more cameras 58, for processing by the processor 50. Additionally or alternatively, the memory device 56 could be configured to store instructions for execution by the processor 50.

The apparatus 45 may, in some embodiments, be embodied by or associated with a user terminal (e.g., mobile terminal 25) configured to employ an example embodiment of the present invention. However, in some embodiments, the apparatus 45 may be embodied as a chip or chip set. In other words, the apparatus 45 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 45 may therefore, in some cases, be configured to implement an embodiment of the present invention on a single chip or as a single "system on a chip." As such, in some cases, a chip or chipset may constitute means for performing one or more operations for providing the functionalities described herein.

The processor 50 may be embodied in a number of different ways. For example, the processor 50 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 50 may include one or more processing cores configured to perform independently. A multi-core processor may enable multiprocessing within a single physical package. Additionally or alternatively, the processor 50 may include one or more processors configured in tandem via the bus to enable independent execution of instructions, pipelining and/or multithreading. In the embodiment in which the apparatus 45 is embodied as a mobile terminal 25, the processor 50 may be embodied by the processor 22.

In an example embodiment, the processor 50 may be configured to execute instructions stored in the memory device 56 or otherwise accessible to the processor 50. Alternatively or additionally, the processor 50 may be configured to execute hard coded functionality. As such, whether configured by hardware or software methods, or by a combination thereof, the processor 50 may represent an entity (e.g., physically embodied in circuitry) capable of performing operations according to an embodiment of the present invention while configured accordingly. Thus, for example, when the processor 50 is embodied as an ASIC, FPGA or the like, the processor 50 may be specifically configured hardware for conducting the operations described herein. Alternatively, as another example, when the processor 50 is embodied as an executor of software instructions, the instructions may specifically configure the processor 50 to perform the algorithms and/or operations described herein when the instructions are executed. However, in some cases, the processor 50 may be a processor of a specific device (e.g., a mobile terminal or network entity) configured to employ an embodiment of the present invention by further configuration of the processor 50 by instructions for performing the algorithms and/or operations described herein. The processor 50 may include, among other things, a clock, an arithmetic logic unit (ALU) and logic gates configured to support operation of the processor 50.

Meanwhile, the communication interface 54 may be any means such as a device or circuitry embodied in either hardware or a combination of hardware and software that is configured to receive and/or transmit data from/to a network, such as network 14, and/or any other device or module in communication with the apparatus 45. In this regard, the communication interface 54 may include, for example, an antenna (or multiple antennas) and supporting hardware and/or software for enabling communications with a wireless communication network. Additionally or alternatively, the communication interface 54 may include the circuitry for interacting with the antenna(s) to cause transmission of signals via the antenna(s) or to handle receipt of signals received via the antenna(s). In some environments, the communication interface 54 may alternatively or also support wired communication. As such, for example, the communication interface 54 may include a communication modem and/or other hardware/software for supporting communication via cable, digital subscriber line (DSL), universal serial bus (USB) or other mechanisms. In the embodiment in which the apparatus 45 is embodied as a mobile terminal 15, the communication interface 54 may be embodied by the antenna 16, transmitter 18, receiver 20 or the like.

In some embodiments, such as instances in which the apparatus 45 is embodied by the user device 11, the apparatus 45 may include a user interface 52 that may, in turn, be in communication with the processor 50 to receive an indication of a user input and/or to cause provision of an audible, visual, mechanical or other output to the user. As such, the user interface 52 may include, for example, a keyboard, a mouse, a joystick, a display, a touch screen(s), touch areas, soft keys, a microphone, a speaker, or other input/output mechanisms. Alternatively or additionally, the processor 50 may comprise user interface circuitry configured to control at least some functions of one or more user interface elements such as, for example, a speaker, ringer, microphone, display, and/or the like. The processor 50 and/or user interface circuitry comprising the processor 50 may be configured to control one or more functions of one or more user interface elements through computer program instructions (e.g., software and/or firmware) stored on a memory accessible to the processor 50 (e.g., memory device 56, and/or the like). In other embodiments, however, such as in instances in which the apparatus 45 is embodied by network entity 13, the apparatus 45 may not include a user interface 52. In still other embodiments, a plurality of apparatuses 45 may be associated with respective devices or the components of the apparatus 45 may be distributed over multiple devices.

Thus, turning now to FIG. 5, the operations of the apparatus 45 for facilitating image and/or video summarization based on facial expressions will now be described. In this regard and as described below, the operations of FIG. 5 may be performed by an apparatus 45, such as shown in FIG. 4, embodied by or otherwise associated with user device 11 and/or network entity 13. In this regard, the apparatus 45 may include means, such as a processor 50, a memory device 56, a communication interface 54, for receiving one or more first frames and one or more second frames. See operation 500. For example, the one or more first frames and one or more second frames may respectively comprise first and second videos or first and second still images (e.g., photographs). According to another example, the one or more first frames may comprise a first video and the one or more second frames may comprise a still image, or vice-versa. The one or more first frames and the one or more second frames may, for example, be received at substantially the same time, so as to allow, for example, summarization to be performed in real-time. The one or more first frames and one or more second frames may, for example, be respectively received via first and second imaging sources. For example, the one or more first frames and one or more second frames may be received from one or more cameras 58, such as a first camera 40 and second camera 42 in an instance in which apparatus 45 is embodied by or otherwise associated with a mobile terminal 25 comprising dual cameras. In such a case, the first camera 40 may, for example, be directed substantially away from an operator, e.g., user, of the mobile terminal 25, while the second camera 42 is directed substantially towards the operator. For example, the first camera may be a rear camera of a dual camera mobile device and the second camera may be a front camera of a dual camera mobile device. Thus, the facial expressions of the operator may be captured via the second camera 42 while the scene being photographed and/or recorded is captured via the first camera 40, such that the one or more first frames comprise the video and/or images to be summarized while the one or more second frames comprise video and/or images of the operator.

The apparatus 45 may also include means, such as a processor 50 and a memory device 56 or the like, for determining at least one video segment in the one or more first frames. See operation 510. One or more video segments may be determined, for example, based on one or more calculations related to differences between two or more frames in the one or more first frames. Further examples and details regarding this operation will be discussed below.

The apparatus 45 may also include means, such as a processor 50 and a memory device 56 or the like, for determining information regarding one or more facial expressions contained in the one or more second frames. See operation 520. Determining information regarding one or more facial expressions may, for example, comprise detecting at least one facial expression change. According to other example embodiments, such as in instances in which the one or more first frames comprise one or more still photos, determining information regarding one or more facial expressions may comprise determining a facial expression present in the one or more second frames or, for example, determining a state or status, such as an emotional state, associated with a facial expression present in the one or more second frames. Determining information regarding one or more facial expressions may, for example, alternatively or additionally comprise determining one or more key frames of the at least one video segment determined above, in operation 510. For example, an embodiment may determine a key frame based on a detected facial expression change. Further examples and details regarding the process of determining one or more key frames will be discussed below.

The apparatus 45 may also include means, such as a processor 50 and a memory device 56 or the like, for causing the information regarding one or more facial expressions to be associated with at least one of the one or more first frames. See operation 530. This operation may, for example, comprise causing at least one key frame of a video segment to be associated with the video segment. This operation may alternatively include, such as in instances in which the one or more first frames comprise still photos, causing at least one of the one or more first frames to be tagged with an indicator of the information regarding the one or more facial expressions. For example, the apparatus 45 may cause an indication of the information regarding the one or more facial expressions to be stored in metadata associated with at least one of the one or more first frames.

The apparatus 45 may further include means, such as a processor 50 and a memory device 56 or the like, for causing a summary of the one or more first frames to be displayed based on the information regarding the one or more facial expressions. See operation 540. For example, the apparatus may cause a visualization of a summary of the one or more first frames to be displayed, the visualization comprising one or more video segments. According to a further example, one or more key frames associated with the one or more video segments may be presented as indicators of their respective video segments. The indicators may, for example, be arranged in a way that allows for intuitive navigation, such as in a list or matrix arrangement. According to another example embodiment, such as in instances in which the one or more first frames comprise still photos, the one or more first frames may, for example, be filtered, sorted, and/or arranged according to the information regarding the one or more facial expressions which they have been associated with. For example, photos could be filtered, sorted, and/or arranged based on a state, e.g., an emotional status, that they have been respectfully associated with.

Thus, turning now to FIG. 6 and having thus described generally certain features and operations associated with example embodiments of the present invention, additional operations and technical aspects of particular example embodiments for facilitating video summarization based on facial expressions will be discussed. Apparatus 45 may comprise means, such as a processor 50 and a memory device 56 or the like, for implementing all of the processes and functionality which are represented in FIG. 6 and will be discussed below.

In this regard, FIG. 6 depicts a real-time video summarization process and facial expression recognition process which may operate in parallel on respective pluralities of first video frames 600a and second video frames 600b respectively received from second 42 and first 40 cameras. Apparatus 45 may begin by causing the pluralities of first 600a and second 600b frames to be buffered, such as in the memory device 56. In order to save computation resource, apparatus 45 may further cause the received video frames to be down-sampled before proceeding with the real-time video summarization process. For example, every video frame may be down-sampled to an RGB color image of no larger than 80×60. Next, apparatus 45 may cause a real-time segmentation algorithm to be applied to the first plurality of video frames so as to decompose the first plurality of video frames into segments. The segmentation may, for example, be performed based on one or more changes in dominant camera motion. The first frame of each segment may be picked out as the initial key frame of the segment and may be presented to the user immediately.

Simultaneously, apparatus 45 may cause a facial expression recognition algorithm to be applied to the second plurality of video frames 600b received from the first camera 40. When apparatus 45 detects a facial expression change, it may cause the current frame to be selected as a key frame to update the initial key frame. Both the real-time segmentation and the facial expression recognition may occur simultaneously with the shooting process.

Returning to the real-time video summarization process, it will be understood that the segmentation process mentioned above involves identifying transitions between adjacent shots. In professional videos, these segments may commonly be physical units formed by transitions comprising camera starts and stops. However, unlike professional videos, many videos shot with mobile devices may contain one or more long and continuous shots. Thus, segmentation based on physical units formed by camera starts/stops may not be applicable in the context of videos shot with mobile devices. However, segment transitions may be determined in videos recorded with a mobile device by relying on camera movement. To accurately and efficiently divide a video recorded with a mobile device into segments, a monitor-decision algorithm, as will now be described, may be implemented via an apparatus 45 including means for carrying out the various calculations, determinations, etc. of the algorithm, such as a processor 50 and a memory device 56 or the like. This monitor-decision algorithm may include three phrases: a potential segment boundary discovering phase 610, a monitoring phase 620, and a decision phase 630.

Potential Segment Boundary Discovering Phase

To avoid unnecessary calculation on those frames which clearly are not located at a segment boundary, example embodiments may first determine one or more potential segment boundaries. Thus, the apparatus 45 may first cause the received first plurality of video frames to be stored in a Potential Boundary Buffer. Next, the apparatus may calculate one or more differences between adjacent frames so as to discover potential segment boundaries. Two features may be extracted to measure the difference among frames: pixel value and/or color histogram.

For the pixel value feature, the pixel difference (PDiff) between adjacent frames $F_i$ and $F_{i-1}$ may be calculated using Eq. (1):

$$P\text{Diff}(F_{i-1},F_i)=\Sigma_{x=1,y=1}^{W,H}|P_{i-1}(x,y)-P_i(x,y)| \quad (1)$$

In Eq. (1), $P_i(x,y)$ denotes the gray level of frame i, and W and H respectively denote the width and height of the frame. For a color frame, the value of a pixel can be calculated from its red (R), green (G) and blue (B) component colors and the gray level $P_i(x,y)$ can be represented in gray level by Eq. (2). In Eq. (2), x and y represent the position coordinate where a pixel locates. Note that integer and shifting operations may be employed in the transition to accommodate mobile devices with low processing power.

$$P_i(x,y)=(76\times R_i(x,y)+150\times G_i(x,y)+30\times B_i(x,y))>>8 \quad (2)$$

For the color histogram feature, each frame may be decomposed by M×N blocks. Then, the block color histogram difference (HBDiff) may be computed using Eq. (3):

$$HB\text{Diff}(b_{i+1},b_{i,k})=\Sigma_{r=0}^{255}b_{i-1,k}(r)-b_{i,k}(r) \quad (3)$$

In Eq. (3), $b_{i,k}$ represents the number that the hue value is equal to r in the kth block of the ith frame. Thus, the total frame color histogram difference (HDiff) may be calculated using Eq. (4):

$$H\text{Diff}(F_{i-1},F_i)=\Sigma_{k=0}^{M\times N}HB\text{Diff}(k) \quad (4)$$

The pixel value and color histogram features respectfully cover local and global characteristics of frames. In order to achieve a good trade-off between the invariance and sensitivity of video content, the two features differences may be combined using Eq. (5) to get a comprehensive measure $T\text{Diff}_i$:

$$T\text{Diff}_i=H\text{Diff}(F_{i-1},F_i)\times P\text{Diff}(F_{i-1},F_i) \quad (5)$$

To measure whether distinct change occurs between adjacent frames, $T\text{Diff}_i$ may be compared to a threshold, $T_d$. A constant threshold may not be appropriate in all cases. Therefore, the apparatus 45 of example embodiments may cause $T_d$ to be adjusted according to either or both of two strategies. The first one is to adjust $T_d$ according to the fusion values of previous frames, which reflect the content activity. For example, if the current captured content includes a relatively high level of activity, $T_d$ may be increased, and vice versa. The other strategy is to adjust $T_d$ according to a focal length. Images may be less stable as focal length increases. Thus, when a user zooms in (e.g., increases the focal length), $T_d$ may be increased, and vice versa. The focal length may be obtained directly from the second camera 42, such as in the form of a zoom coefficient, e.g., $C_{zoom}$. When the TDiff value of frame i is greater than $T_d$, all of the frames following frame i in the Potential Boundary Buffer may be selected for further processing in the monitoring phase 620 such as, for example, by transferring the selected frames to a Monitoring Buffer.

Monitoring Phase

During the monitoring phase 620, the apparatus 45 may calculate TDiff for each frame in the Monitoring Buffer to determine when the monitoring phase should end. In addition, motion information may be collected during the monitoring phase. The monitoring phase may end when there are n successive frames having a smaller TDiff value than $T_d$. A value greater than 1 may be chosen for n, as ordinary users cannot shoot as stably as can a professional, meaning that some unsteadiness can be expected. When a stable stage is detected, all frames which are located in the Monitoring Buffer and which precede the nth successive frame having a smaller TDiff value than $T_d$ may be selected for even further processing in the decision phase 630. These selected frames thus comprise a frame sequence $S=\{F_i|p<<i<<e\}$, where p and e are the first and last frame indicates in the monitoring phase. In the decision phase, the apparatus 45 may determine whether $F_s$ is a segment boundary and, thus, whether frame sequence S comprises a video segment.

Decision Phase

To determine whether $F_s$ is a segment boundary, the apparatus 45 may further calculate an accumulative motion vector for S obtained in Monitoring Phase. To determine an accumulative motion vector for S, motion vectors need to be calculated for each frame i. It will be understood that many possible algorithms exist for determining the motion vector of frame i. For example, a diamond search algorithm may be suitable for determining $MV_i$. See S. Zhu and K. K. Ma., "A New Diamond Search Algorithm for Fast Block-matching Motion Estimation," *IEEE Transactions on Image Processing*, (9):287-290 (2000). The diamond search algorithm may use a diamond-shaped search pattern to enable fast block motion estimation. It employs two search patterns—a large diamond search pattern (LDSP) and a small diamond search pattern (SDSP)—and an efficient search strategy to speed up computing process. The apparatus 45 may then use Eq. (6) to determine segment boundaries:

$$\begin{cases} \sum_{i=p}^{s} MV_i > (\alpha \times W \times C_{zoom})^2 \\ TDiff(F_p, F_s) > T \end{cases} \quad (6)$$

In the first part of Eq. (6), $\Sigma_{i=p}^{s} MV_i$ denotes the accumulative motion vector for S; $\alpha$ is an empirical coefficient; W is the width of the frames; $C_{zoom}$ is a zoom coefficient; and in the second part of Eq. (6), T is an empirical threshold. The first part of Eq. (6) means that the accumulative motion amplitude of S should be sufficiently large. Zoom coefficient $C_{zoom}$ is taken into account because motion amplitude may become larger as focal length increases. The second part of Eq. (6) means that the last frame $F_s$ of the monitoring phase should be significantly different from the first frame $F_p$. When both of these conditions are met, $F_s$ may be determined to be a segment boundary and, thus, S may be determined to be a video segment. Apparatus 45 may then select $F_s$ as an initial key frame for video segment S and then update the key frame based on the results of the facial expression recognition process.

In this regard, if the facial expression recognition process detects a facial expression change, a frame corresponding to the facial expression change may be selected as the key frame. For example, initial key frame $F_s$ may be updated based on one or more frames corresponding to the detected facial expression change. According to other example embodiments, a key frame may be selected based on the detected facial expression change immediately, instead of first selecting an initial key frame and updating it. According to example embodiments, only one key frame may be selected for each segment to save resources. According to other embodiments, however, multiple key frames may be selected so that, for example, a short preview clip may be presented as part of the video summary for each segment. The facial expression recognition process may, for example, indicate that a facial expression change has been detected by setting a "facial expression changed flag," the value of which is available to the video summarization process, to TRUE.

It will be understood by persons of skill in the art that many appropriate algorithms exist for determining facial expressions and/or detecting changes in facial expressions within one or more frames and, accordingly, apparatus 45 may include means, such as the processor 50 and memory device 56 or the like, for implementing any of these algorithms. As but one example, the algorithm proposed by Philipp Michel and Rana Elizabeth Kaliouby would be suitable. See P. Michel and R. Kaliouby, "Real Time Facial Expression Recognition in Video using Support Vector Machines" in *Proceedings of the Fifth Internation Conference on Multimodal Interfaces (ICMI)* (November, 2003). This algorithm uses real time facial feature tracking to deal with the problems of face localization and feature extraction in spontaneous expressions. The positions of 22 facial features are extracted from a video stream and displacements are calculated for each feature between a neutral and a representative frame of an expression. These are used together with the label of the expression as input to the training stage of an SVM (Support Vector Machines) classifier. The trained SVM model is subsequently used to classify unseen feature displacements in real time, either upon user request or continuously, for every frame in the video stream. With respect to determining facial expressions in still photos, many suitable algorithms are also available. As but one example, H B Deng, et al. provides a suitable algorithm for determining facial expressions in still photos. See H B Deng, et al., "A New Facial Expression Recognition Method Based on Local Gabor Filter Bank and PCA plus PDA", International Journal of Information Technology, Vol. 11, No. 11 (2005).

As described above, FIGS. 5 and 6 illustrate flowcharts representing operations of an apparatus 45, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or enhanced. Furthermore, in some embodiments, additional optional operations may be included. Modifications, additions, or enhancements to the operations above may be performed in any order and in any combination.

The method, apparatus 45 and computer program product described above provide many advantages. For example the method, apparatus 45 and computer program products may allow video and/or image summarization to be performed by mobile devices in real time. In addition, embodiments of the present invention may provide more robust summarization of videos shot with mobile devices, which may consist of long continuous shots which are to summarize using conventional methods. Furthermore, embodiments of the present invention may allow videos and/or images to be presented to users in an intuitive, summarized manner, allowing easier access to, sharing of, and manipulation of user-created content.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
receiving one or more first frames and one or more second frames, wherein the one or more second frames were captured by a front camera of a mobile device during a shooting process while the one or more first frames were captured by a back camera of the mobile device during the shooting process;
determining information regarding one or more facial expressions contained in the one or more second frames, wherein the information comprises the one or more facial expressions recognized during the shooting process of the front camera of the mobile device; and
causing the information regarding the one or more facial expressions to be associated with at least one of the one or more first frames.

2. The method of claim 1, wherein:
the one or more first frames comprise a first still image and the one or more second frames comprise a second still image;
determining information regarding one or more facial expressions contained in the one or more second frames comprises determining information regarding one or more facial expressions contained in the second still image; and
causing the information regarding the one or more facial expressions to be associated with at least one of the one or more first frames comprises causing the first still image to be tagged with an indication of the information regarding the one or more facial expressions contained in the second still image.

3. The method of claim 1, wherein:
the one or more first frames comprise a first plurality of video frames and the one or more second frames comprise a second plurality of video frames, the method further comprising determining, in the first plurality of video frames, at least one video segment;
determining information regarding one or more facial expressions contained in the one or more second frames comprises detecting, in the second plurality of video frames, at least one facial expression change and determining, based at least in part on the at least one facial expression change, at least one key frame of the at least one video segment; and
causing the information regarding the one or more facial expressions to be associated with at least one of the one or more first frames comprises causing the at least one key frame to be associated with the at least one video segment.

4. An apparatus comprising at least one processor and at least one memory including program code instructions, the memory and program code instructions being configured to, with the at least one processor, cause the apparatus to at least:
receive one or more first frames and one or more second frames, wherein the one or more second frames were captured by a front camera of a mobile device during a shooting process while the one or more first frames were captured by a back camera of the mobile device during the shooting process;
determine information regarding one or more facial expressions contained in the one or more second frames, wherein the information comprises the one or more facial expressions recognized during the shooting process of the front camera of the mobile device; and
cause the information regarding the one or more facial expressions to be associated with at least one of the one or more first frames.

5. The apparatus of claim 4, wherein:
the one or more first frames comprise a first still image and the one or more second frames comprise a second still image;
the apparatus is caused to determine information regarding one or more facial expressions contained in the one or more second frames by determining information regarding one or more facial expressions contained in the second still image; and
the apparatus is caused to cause the information regarding the one or more facial expressions to be associated with at least one of the one or more first frames by causing the first still image to be tagged with an indication of the information regarding the one or more facial expressions contained in the second still image.

6. The apparatus of claim 4, wherein:
the one or more first frames comprise a first plurality of video frames and the one or more second frames comprise a second plurality of video frames, the apparatus being further caused to determine, in the first plurality of video frames, at least one video segment;
the apparatus is caused to determine information regarding one or more facial expressions contained in the one or more second frames by detecting, in the second plurality of video frames, at least one facial expression change and determining, based at least in part on the at least one facial expression change, at least one key frame of the at least one video segment; and the apparatus is caused to cause the information regarding the one or more facial expressions to be associated with at least one of the one or more first frames by causing the at least one key frame to be associated with the at least one video segment.

7. The apparatus of claim 6, wherein determining, in the first plurality of video frames, at least one video segment comprises determining at least one potential segment boundary.

8. The apparatus of claim 7, wherein determining at least one potential segment boundary comprises calculating difference values for frames in the first plurality of video frames and comparing the one or more difference values to a threshold, wherein the apparatus is further caused to, in an instance in which a difference value is determined to exceed the threshold, select for further processing one or more frames following the frame whose difference value exceeds the threshold.

9. The apparatus of claim 8, further comprising causing the threshold to be adjusted at least one of: based on a fusion value of one or more previous frames; and
according to a focal length.

10. The apparatus of claim 8, wherein the apparatus is further caused to calculate difference values for frames that were selected for further processing, the apparatus being further caused to, in an instance in which the difference values calculated for a predetermined number of consecutive frames do not exceed the threshold value, select for even further processing, one or more of the frames preceding the last of the consecutive frames whose difference value does not exceed the threshold and which were selected for further processing.

11. The apparatus of claim 10, wherein the apparatus is further caused to calculate an accumulative motion vector for the frames selected for even further processing; wherein the apparatus is caused to determine at least one video segment by determining, based at least in part on the accumulative motion vector, whether the one or more frames selected for even further processing comprise a video segment.

12. The apparatus of claim 11, wherein the apparatus is further caused to calculate a difference between the first and last of the frames selected for even further processing; wherein the apparatus is caused to determine at least one video segment by, or further by, determining, based at least in part on the difference between the first and last of the frames selected for even further processing, whether the one or more frames selected for even further processing comprise a video segment.

13. The apparatus of claim 8, wherein calculating the difference value of a frame comprises at least one of:
calculate a pixel difference between the frame and an adjacent frame; and
calculate a block color histogram difference between the frame and an adjacent frame.

14. The apparatus of claim 6, wherein determining, based at least in part on the at least one facial expression change, at least one key frame of the at least one video segment comprises selecting a last frame of the at least one video segment as an initial key frame and updating the key frame based on one or more frames corresponding to the detected facial expression change.

15. The apparatus of claim 6, wherein the apparatus is further caused to cause the key frame to be presented as an identifier of the at least one video segment.

16. The apparatus of claim 4, wherein the one or more first frames and the one or more second frames are received at substantially the same time.

17. The apparatus of claim 4, wherein the one or more first frames are received from a first imaging source and the one or more second frames are received from a second imaging source.

18. The apparatus of claim 17, wherein the first and second imaging sources respectively comprise first and second cameras of a device, the first camera being directed substantially away from an operator of the device and the second camera being directed substantially towards the operator of the device.

19. The apparatus of claim 18, wherein the device comprises a mobile phone.

20. The apparatus of claim 4, wherein the apparatus is further caused to cause a summary of the one or more first frames to be displayed based on the information regarding the one or more facial expressions.

* * * * *